( 12 ) United States Patent
Benson

(10) Patent No.: US 10,100,961 B2
(45) Date of Patent: Oct. 16, 2018

(54) JOINT ASSEMBLY AND A METHOD OF USING THE SAME

(71) Applicant: ROLLS-ROYCE PLC, London (GB)

(72) Inventor: Christopher Benson, Derby (GB)

(73) Assignee: ROLLS-ROYCE plc, London (GB)

( * ) Notice: Subject to any disclaimer, the term of this patent is extended or adjusted under 35 U.S.C. 154(b) by 394 days.

(21) Appl. No.: 14/962,540

(22) Filed: Dec. 8, 2015

(65) Prior Publication Data

US 2016/0177785 A1    Jun. 23, 2016

(30) Foreign Application Priority Data

Dec. 22, 2014  (GB) .................................. 1422936.3

(51) Int. Cl.
*F16L 37/14* (2006.01)
*F16B 3/04* (2006.01)
(Continued)

(52) U.S. Cl.
CPC ............ *F16L 37/148* (2013.01); *F01D 25/24* (2013.01); *F01D 25/243* (2013.01); *F16B 3/04* (2013.01);
(Continued)

(58) Field of Classification Search
CPC .... F01D 25/24; F01D 25/243; F05D 2220/32; F05D 2260/36; F16B 3/04; F16B 5/0084;
(Continued)

(56) References Cited

U.S. PATENT DOCUMENTS 3,637,239 A * 1/1972 Daniel .................. F16L 37/088
                                                       285/230
4,611,837 A * 9/1986 Aleck .................. F16L 37/088
                                                       285/305
(Continued)

FOREIGN PATENT DOCUMENTS

DE       946580 C  *  8/1956  ............... F16J 13/02
DE       966298 C  *  7/1957  ............. E04G 7/301
(Continued)

OTHER PUBLICATIONS

"Helical Spring Energized Seals." Eriks Seals and Plastics. Oct. 8, 2013, [online], [retrieved on Jan. 3, 2018] Retrieved from the Internet <URL: https://web.archive.org/web/20130810001700/http://www.eriksusa.com/products/helical-spring-seals.php>.*
(Continued)

*Primary Examiner* — Josh Skroupa
(74) *Attorney, Agent, or Firm* — Oliff PLC

(57) ABSTRACT

A joint assembly includes a first end portion of a first hollow component, a second end portion of a second hollow component, and a first and second resilient connection member. First end portion interconnects with second end portion. First end portion includes a first and second location feature on an outwardly facing surface and axially distally facing surface respectively. Second end portion includes a third and fourth location feature on an inwardly facing surface and axially distally facing surface respectively. First end portion is slidably received inwardly of second end portion, with first location feature being aligned with third location feature to form a first annular cavity, and second location feature being aligned with fourth location feature to form a second annular cavity. First connection member is receivable within first annular cavity, and second connection member is receivable within second annular cavity, to interlock first component to second component.

7 Claims, 2 Drawing Sheets

(51) Int. Cl.
*F16B 7/04* (2006.01)
*F16B 21/07* (2006.01)
*F16B 21/18* (2006.01)
*F01D 25/24* (2006.01)

(52) U.S. Cl.
CPC .......... *F16B 7/0406* (2013.01); *F16B 21/073* (2013.01); *F16B 21/18* (2013.01); *F05D 2220/32* (2013.01); *F05D 2260/30* (2013.01); *F05D 2260/36* (2013.01); *Y02T 50/672* (2013.01); *Y10T 403/64* (2015.01)

(58) Field of Classification Search
CPC ...... F16B 7/0406; F16B 7/0413; F16B 7/042; F16B 21/07; F16B 21/073; F16B 21/18; F16B 21/183; F16B 2005/0678; F16L 23/006; F16L 27/1012; F16L 27/1021; F16L 27/1025; F16L 37/08; F16L 37/14; F16L 37/142; F16L 37/148; F16L 47/14; F16L 49/04; Y10T 403/45; Y10T 403/453; Y10T 403/459; Y10T 403/64–403/648; Y10T 403/7092
USPC ................. 403/220, 223, 229, 335–338, 380, 403/DIG. 14; 285/318, 321
See application file for complete search history.

(56) References Cited

U.S. PATENT DOCUMENTS

| | | | | | |
|---|---|---|---|---|---|
| 5,219,190 | A | * | 6/1993 | Grammel, Jr. ............ | F02K 1/04 285/276 |
| 5,419,594 | A | * | 5/1995 | Nelms .................... | F16L 37/088 285/315 |
| 5,664,951 | A | * | 9/1997 | Clary .................... | F16L 37/148 141/382 |
| 6,053,539 | A | * | 4/2000 | Bravo .................... | F16L 27/044 285/148.15 |
| 7,874,791 | B2 | * | 1/2011 | Ferber .................... | F01D 5/225 415/137 |
| 8,246,083 | B2 | * | 8/2012 | Ferrali .................. | F16L 37/148 285/305 |
| 9,810,322 | B2 | * | 11/2017 | Bueter ................ | F15B 15/1447 |
| 2004/0195834 | A1 | * | 10/2004 | Steingass .............. | F16L 37/148 285/321 |
| 2017/0321755 | A1 | * | 11/2017 | Sherlock ............... | F16D 1/0829 |

FOREIGN PATENT DOCUMENTS

| | | | | | |
|---|---|---|---|---|---|
| DE | 2851997 | A1 | * | 6/1980 | ................ F16B 3/04 |
| DE | 102005031009 | A1 | * | 1/2007 | ............. F16H 55/56 |
| EP | 340499 | A | * | 11/1989 | ............. F16L 37/148 |
| EP | 0438296 | A2 | * | 7/1991 | ............ F16L 37/148 |
| EP | 0807782 | A2 | * | 11/1997 | ................ E03F 3/04 |
| EP | 2740945 | A2 | | 6/2014 | |
| FR | 1238801 | A | * | 8/1960 | ............ F16L 37/148 |
| FR | 2858375 | A1 | * | 2/2005 | ............. B60B 27/00 |
| WO | WO 2009059624 | A1 | * | 5/2009 | ............ F16L 37/148 |

OTHER PUBLICATIONS

Translation of DE 2851997. Brielmaier, Albrecht. Fluid-tight pipe connection system—has common circumferential groove with wire insert to lock pipes together. Jun. 12, 1980.*

Mar. 26, 2015 Search Report issued in British Patent Application No. 1422936.3.

* cited by examiner

JOINT ASSEMBLY AND A METHOD OF USING THE SAME

This disclosure claims the benefit of UK Patent Application No. GB 1422936.3, filed on 22 Dec. 2014, which is hereby incorporated herein in its entirety.

FIELD OF THE DISCLOSURE

The present disclosure relates to a joint assembly and particularly, but not exclusively, to a joint assembly for locking two components together, together with a method of using such a joint assembly.

BACKGROUND TO THE DISCLOSURE

It is known to use a wired joint to lock two cylindrical components to one another. Such an arrangement uses a wire having a round (shown in FIGS. 1 and 2) cross section which is inserted into an annular cavity between the two components through a slot in the outer surface of the assembled components.

In order to ensure that the assembled components are held securely together, it is necessary for the wire to be a close fit in the annular cavity. The frictional forces resulting from this close fit make insertion, and particularly removal, of the wire difficult. This in turn renders this joint arrangement impractical for applications, such as gas turbine engines, where a cylindrical joint needs to be made and broken for maintenance and repair without having to apply undue force.

Most gas turbine engines employ conventional nut and bolt configurations to secure together the main structural engine components, such as fan and body casing parts. The temperature of gases passing through the engine can range between approximately 700° C. and approximately 2500° C. which can cause thermal cycling problems. As the engine temperature varies through such a temperature range, bolts tend to gall and seize. This can require the bolts to be drilled out during the disassembly of the engine, which is expensive and time-consuming. In addition, the use of nuts and bolts requires the use of corresponding flanges on the parts to be joined, which adds to weight and increases assembly time. Furthermore, in some arrangements, bolts heads are positioned in the gas flow path which may disrupt the aerodynamics of the engine and may accelerate the deterioration of the bolt.

The joint assembly of the present disclosure eliminates the requirement for a nut and bolt configuration and so reduces weight, speeds assembly and repair, minimises aerodynamic disruption in the flow path through the assembled components is simpler and less expensive than a conventional joint assembly, and reduces the high stress concentrations and bending loads associated with a bolted flanged joint.

STATEMENTS OF DISCLOSURE

According to a first aspect of the present disclosure there is provided a joint assembly comprising:
 a first end portion of a first hollow component;
 a second end portion of a second hollow component;
 a first resilient connection member; and
 a second resilient connection member,
 wherein the first end portion interconnects with the second end portion,
 the first end portion comprising a first location feature on an outwardly facing surface, and a second location feature on an axially distally facing surface,
 the second end portion comprising a third location feature on an inwardly facing surface, and a fourth location feature on an axially distally facing surface,
 the first end portion being slidably received inwardly of the second end portion, with the first location feature being aligned with the third location feature to form a first annular cavity, and the second location feature being aligned with the fourth location feature to form a second annular cavity,
 the first connection member being receivable within the first annular cavity, and the second connection member being receivable within the second annular cavity, to interlock the first component to the second component.

The use of two connection members enables the joint assembly of the disclosure to accommodate a wide range of combined loading conditions, which could not readily be accommodated by a conventional wired joint having a single connection member.

The axial and radial separations of the first and second connection members enables the joint assembly to withstand complex load arrangements such as, for example, a combination of shear, bending, tension and/or compression.

By varying the axial and radial separations of the first and second connection members it is possible to optimise the mechanical capability of the joint assembly for any particular combined load case.

In this way, the joint assembly of the disclosure provides a more weight efficient means of joining a first component to a second component where bending loads are to be transferred across the joint assembly.

Optionally, each of the outwardly facing surface of the first end portion, and the inwardly facing surface of the second end portion, lie in a plane parallel with an axis of the joint assembly.

This makes the first end portion and the second end portion simpler and more cost effective to manufacture because they can be, for example, surfaces of revolution where the first component and second component are revolute components.

In other arrangements, the outwardly facing surface of the first end portion, and the inwardly facing surface of the second end portion may lie in a plane that is inclined relative to the axis of the joint assembly. Such an arrangement will be more expensive and time-consuming to manufacture than the above-mentioned 'parallel' arrangement.

However, the inclined, inwardly and outwardly facing surfaces can allow for more effective load transfer across the joint. For example, the angle of the inclined surfaces may be chosen to align with a particular applied load so as to generate shear loading across the wired joint.

Optionally, each of the axially distally facing surface of the first end portion, and the axially distally facing surface of the second end portion, and lie in a plane normal to an axis of the joint assembly.

The choice of a plane normal to an axis of the joint assembly for each of the axially distally facing surface of the first end portion, and the axially distally facing surface of the second end portion makes these surfaces easier and cheaper to produce than other orientations of these surfaces.

In other arrangements, these axially distally facing surfaces may be oriented at an angle other than normal to an axis of the joint assembly. For example, they may be oriented such that they lie in the plane of an applied load. This allows the applied load to be transferred across the wired joint in shear; this being the most efficient load transfer arrangement for a wired joint.

Optionally, each of the first connection member and the second connection member is helical.

The use of a helical connection member makes the joint assembly easier to assemble and dismantle because its outer diameter can be reduced on assembly and dismantling by stretching or twisting the connection member along its length.

Optionally, the outwardly facing surface of the first end portion and the inwardly facing surface of the second end portion overlie one another by an axial overlap length, the axial overlap length being approximately four to eight times a radial cross-sectional diameter of the first annular cavity.

The axial overlap between the first end portion and the second end portion provides the joint assembly with capacity to withstand in-plane bending loads applied across the joint assembly.

Optionally, the axially distally facing surface of the first end portion and the axially distally facing surface of the second end portion overlie one another by an radial length, the radial length being approximately two to five times the radial cross-sectional diameter of the annular cavity.

The radial length of the axially distal surfaces of the second connection portion and corresponding fourth connection portion provides the joint assembly with capacity to withstand in-plane bending loads applied across the joint assembly.

According to a second aspect of the present disclosure there is provided a gas turbine engine fan casing comprising a joint assembly according to the first aspect of the disclosure.

In other arrangements, the joint assembly of the disclosure may be applied to other containment or casing structures.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawing in which.

Figure 1:
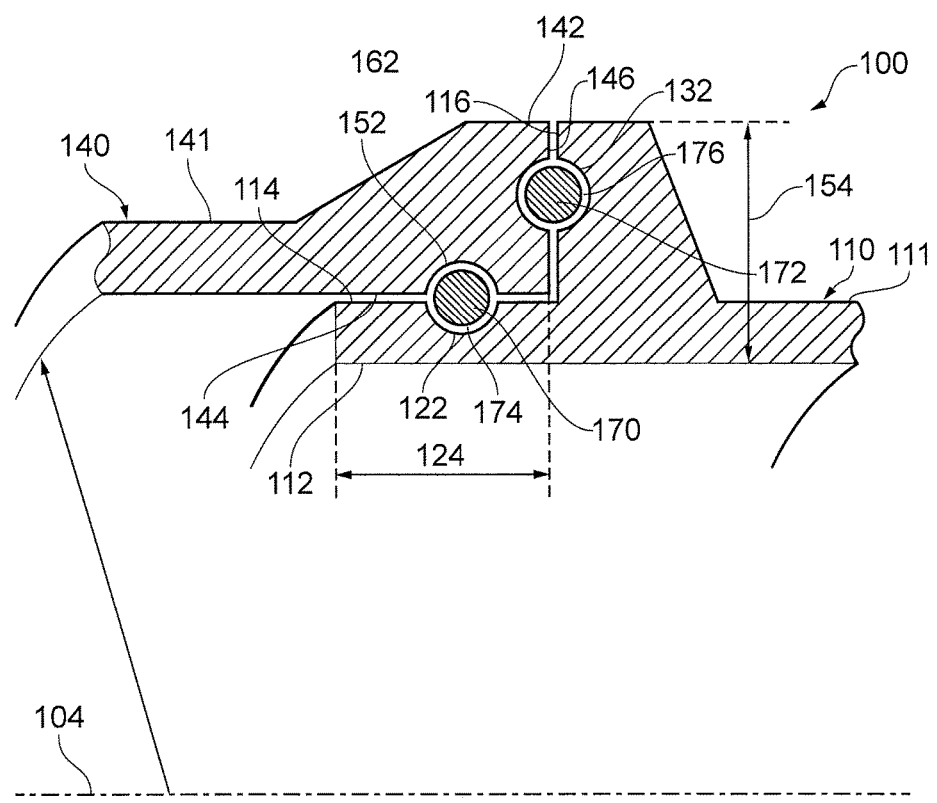
FIG. 1 shows a partial sectional view of the interconnected first and second end portions of a joint assembly according to a first embodiment of the invention.

It is noted that the drawing may not be to scale. The drawing is intended to depict only a typical aspect of the disclosure, and therefore should not be considered as limiting the scope of the disclosure.

DETAILED DESCRIPTION

Referring to FIG. 1, a joint assembly according to a first embodiment of the disclosure is designated generally by the reference numeral 100. The joint assembly 100 comprises an annular first end portion 112 of a first component 110, an annular second end portion of a second component 140, a first resilient connection member 170, and a second resilient connection member 172.

In the embodiment shown in the figures, the first component 110 and the second component 140 form part of a fan casing (not shown) of an aircraft turbofan engine (also not shown). In this arrangement, each of the first component 110 and the second component 140 is formed as a revolute component. In other arrangements, the first component 110 and the second component 140 may have an alternate cross-sectional geometry such as, for example, an elliptical geometry.

In the present embodiment, each of the first component 110 and the second component 140 is formed from a titanium alloy forging. In other embodiments the first component 110 and/or the second component 140 may be formed from another material such as a steel, alloy, an aluminium alloy or a fibre-reinforced composite material.

The connection member 170 is formed from helical flat spring steel wire. In other arrangements, the connection member 170 may be formed from spring steel wire having a circular cross-section.

The first end portion 112 interconnects with the second end portion 142, with the first end portion 112 being accommodated within the second end portion 142.

Each first end portion 112 comprises a first location feature 122 on a radially outwardly facing surface 114 of the first end portion 112, and a second location feature 132 on an axially distally facing surface 116 of the first end portion 112.

The first location feature 122 is formed as a curved hemispherical groove on the radially outwardly facing surface 114 of the first end portion 112. The second location feature 132 is formed as a curved hemispherical groove on the axially distally facing surface 116 of the first end portion 112.

Each second end portion 142 comprises a third location feature 152 on a radially inwardly facing surface 144 of the second end portion 142, and a fourth location feature 162 on an axially distally facing surface 146 of the second end portion 142.

The third location feature 152 is formed as a curved hemispherical groove on the radially inwardly facing surface 144 of the second end portion 142. The fourth location feature 162 is formed as a curved hemispherical groove on the axially distally facing surface 146 of the second end portion 142.

In this embodiment, each of the radially outwardly facing surface 114 and the radially inwardly facing surface 144 lie in a circumferential plane that is parallel to an axis 104 of the joint assembly 100. Similarly, in this embodiment, each of the axially distal surface 116 and the axially distal surface 146 lie in a plane normal to an axis 104 of the joint assembly 100

In this embodiment, the first component 110 has a first wall portion 111 having a thickness of 5 mm. This wall thickness is maintained across the axial extent of the first end portion 112. Similarly, the second component 140 has a second wall portion 141 having a thickness of 5 mm. An axial overlap 124 between each first end portion 112 and the corresponding second end portion 142 is 30 mm.

At the first end portion 112, the thickness of the first end portion 112 increases from that of the first wall portion 111 (i.e. 5 mm in the present embodiment) to 15 mm at the distal end of the first end portion 112. Correspondingly, at the second end portion 142 the thickness of the second end portion 142 increases from that of the second wall portion 111 (i.e. 5 mm in the present embodiment) to a radial length 154 having a value of 20 mm at the fourth connection portion 130.

In other arrangements, the thickness of the first and second wall portions 111,141, and the first and second end portions 112,142, together with the axial and radial overlaps 124,154 may take alternative values dependent upon loading and structural constraints.

In use, the first end portion 110 of the first component 110 is aligned with the second end portion 142 of the second component 140.

The first end portion 112 is slidably received radially inwardly of the second end portion 142, with the axially distal surface 116 of the first end portion 112 abutting against the axially distal surface 146 of the second end portion 142.

In this configuration, the first location feature 122 is aligned with the third location feature 152 to form a first annular cavity 174, and the second location feature 132 is aligned with the fourth location feature 162 to form a second annular cavity 176.

The first connection member 170 is receivable within the first annular cavity 174, and the second connection member 172 is receivable within the second annular cavity 176, to interlock the first component 110 to the second component 140.

Figure 2:
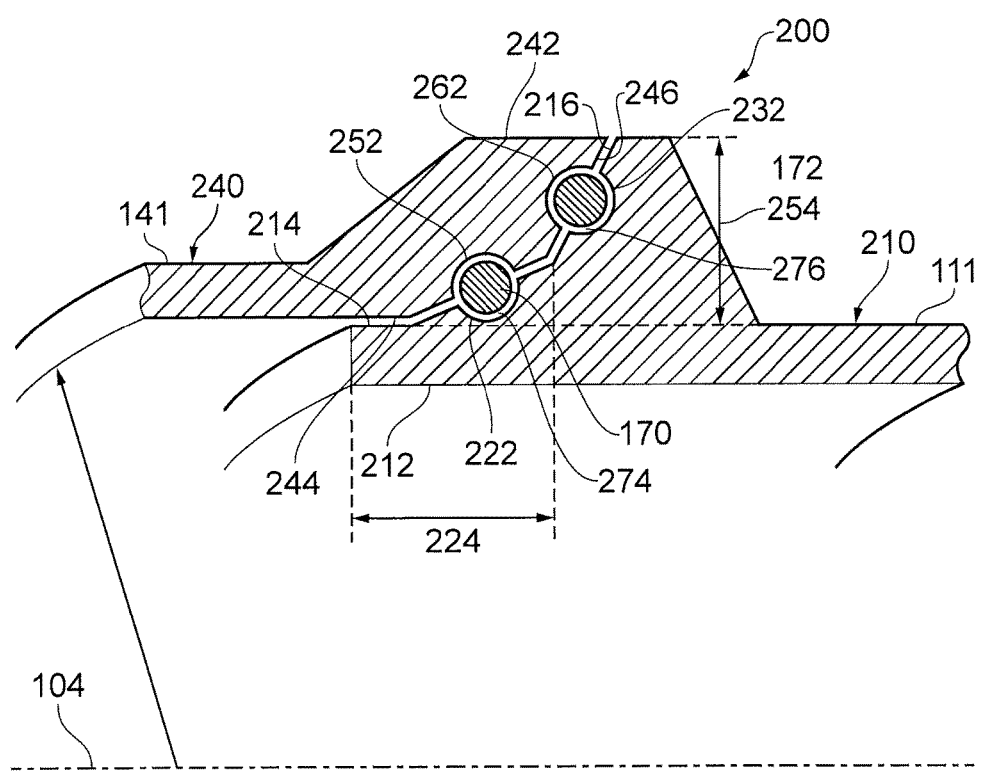
FIG. 2 shows a partial sectional view of the interconnected first and second end portions of a joint assembly according to a second embodiment of the invention.

Referring to FIG. 2, a joint assembly according to a second embodiment of the disclosure is designated generally by the reference numeral 200. Features of the joint assembly 200 which correspond to those of the joint assembly 100 have been given corresponding reference numerals for ease of reference.

The joint assembly 200 comprises an annular first end portion 212 of a first component 210, an annular second end portion 242 of a second component 240 a first resilient connection member 170, and a second resilient connection member 172.

The first end portion 212 interconnects with the second end portion 242 in the same manner as that described above in respect of the first embodiment.

Each first end portion 212 comprises a first location feature 222 on a radially outwardly facing surface 214 of the first end portion 212, and a second location feature 232 on an axially distally facing surface 216 of the first end portion 212.

Each second end portion 242 comprises a third location feature 252 on a radially inwardly facing surface 244 of the second end portion 242, and a fourth location feature 262 on an axially distally facing surface 246 of the second end portion 242.

In this embodiment, each of the radially outwardly facing surface 214 and the radially inwardly facing surface 244 lie in a circumferential plane that is inclined at an acute angle to an axis 104 of the joint assembly 200. The inclination of the circumferential plane may be selected dependent upon the applied loading to which the joint assembly 200 is to be subjected.

In this embodiment, each of the axially distal surface 216 and the axially distal surface 246 are inclined at an acute angle to a plane normal to an axis 104 of the joint assembly 200. The selection of the angle of inclination of the axially distal surfaces 216,246 may be dependent upon the applied loading to which the joint assembly 200 is to be subjected.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

The invention claimed is:

1. A joint assembly comprising:
   a first end portion of a first hollow component, the first end portion including a first location groove recessed into an outwardly facing surface, and a second location groove recessed into an axially distally facing surface;
   a second end portion of a second hollow component, the second end portion including a third location groove recessed into an inwardly facing surface, and a fourth location groove recessed into an axially distally facing surface, the first end portion interconnects with the second end portion;
   a first resilient connection member; and
   a second resilient connection member, wherein:
      the first end portion is slidably located inwardly of the second end portion, where the first location groove is aligned with the third location groove to form a first annular cavity, and the second location groove is aligned with the fourth location groove to form a second annular cavity, and
      the first connection member is disposed in the first annular cavity, and the second connection member is disposed in the second annular cavity, interlocking the first component to the second component.

2. The joint assembly as claimed in claim 1, wherein each of the outwardly facing surface of the first end portion, and the inwardly facing surface of the second end portion, are located in a plane parallel with an axis of the joint assembly.

3. The joint assembly as claimed in claim 1, wherein each of the axially distally facing surface of the first end portion, and the axially distally facing surface of the second end portion, are located in a plane normal to an axis of the joint assembly.

4. The joint assembly as claimed in claim 1, wherein the first connection member and the second connection member are each helical.

5. The joint assembly as claimed in claim 1, wherein the outwardly facing surface of the first end portion and the inwardly facing surface of the second end portion overlap one another by an axial overlap length, the axial overlap length being approximately four to eight times a radial cross-sectional diameter of the first annular cavity.

6. The joint assembly as claimed in claim 1, wherein the axially distally facing surface of the first end portion and the axially distally facing surface of the second end portion overlap one another by an radial length, the radial length being approximately two to five times a radial cross-sectional diameter of the first annular cavity.

7. A gas turbine engine fan casing comprising the joint assembly as claimed in claim 1.

* * * * *